United States Patent
Shinya et al.

(10) Patent No.: US 7,012,699 B2
(45) Date of Patent: Mar. 14, 2006

(54) METHOD OF AND APPARATUS FOR MEASURING THICKNESS OF THIN FILM OR THIN LAYER

(75) Inventors: Kazunari Shinya, Osaka-fu (JP); Takashi Nishimura, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 347 days.

(21) Appl. No.: 10/643,870

(22) Filed: Aug. 20, 2003

(65) Prior Publication Data

US 2004/0105101 A1    Jun. 3, 2004

(30) Foreign Application Priority Data

Aug. 23, 2002    (JP) .............................. 2002-244234

(51) Int. Cl.
*G01B 11/02*    (2006.01)
(52) U.S. Cl. ...................... 356/504; 356/503; 356/630; 356/632; 250/559.28
(58) Field of Classification Search .............. 356/503, 356/504
See application file for complete search history.

(56) References Cited

U.S. PATENT DOCUMENTS 3,824,017 A * 7/1974 Galyon ....................... 356/504

2002/0163649 A1 * 11/2002 Hirose et al. ................ 356/504

FOREIGN PATENT DOCUMENTS

JP    2003-344024    12/2003

* cited by examiner

*Primary Examiner*—Gregory J. Toatley, Jr.
*Assistant Examiner*—Roy M. Punnoose
(74) *Attorney, Agent, or Firm*—Westerman, Hattori, Daniels & Adrian LLP

(57) ABSTRACT

The present invention provides a method of measuring the thickness of a thin film or thin layer by a spectroscopic measurement, which is applicable to the measurement of a multiple layered film whose layers have different refractive indices. According to the method, an interference light from the film is measured to create a measured spectrum. The waveform of the measured spectrum can be approximately represented by a linear sum of base spectrums. Accordingly, various constructed spectrums are created using base spectrums each having a cycle interval as a parameter. Then, the constructed spectrum that minimizes the square error against the measured spectrum is identified. The least square error is calculated for each of predetermined cycle intervals. A graph is drawn to represent the relation between the least square error and the cycle interval. The correspondence between the layers and the plural minimum points of the least square error appearing on the graph is determined. The thickness of each layer is calculated from the cycle interval at which the minimum point appears and the refractive index of the layer.

17 Claims, 4 Drawing Sheets

METHOD OF AND APPARATUS FOR MEASURING THICKNESS OF THIN FILM OR THIN LAYER

The present invention relates to a method of and apparatus for measuring the thickness of a thin film or thin layer using the spectroscopic measurement. The method and apparatus can be used in various fields including, for example, the measurement of the thickness of various layers on a wafer substrate in the semiconductor industry.

BACKGROUND OF THE INVENTION

An application of a spectrophotometer using visible light or infrared light is the measurement of the thickness of a thin film or thin layer on a substrate. The principle of the spectroscopic thickness measurement is as follows.

When a ray of incident light (or measurement light) I0 having a single wavelength is cast on a thin layer (or sample) S, as shown in FIG. 8, a part of the light is reflected on the front surface S1 of the sample S, and the remainder enters the sample S. A part of the incoming light is also reflected by the rear surface S2 (i.e. the boundary with the substrate), goes back through the sample S, and goes out through the front surface S1. Since the first reflected light R1 and the second reflected light R2 have different optical path lengths, an interference occurs between the two light waves R1 and R2, depending on the wavelength $\lambda$ of the measurement light I0 and the thickness d of the sample S. When a graph is drawn with the wavelength (or wavenumber) of the measurement light as the abscissa and the intensity of the interference light as the ordinate while the wavelength of the measurement light is changed (or scanned), a wavy interference spectrum is obtained. The waveform of the interference spectrum can be represented by a cosine function whose cycle interval corresponds to the thickness d of the sample. Therefore, using the interference spectrum, it is possible to determine the thickness d of the sample S by the following steps: automatically or manually measuring the wavenumber at each crest (or peak) or trough (or valley) of the interference spectrum, determining the cycle interval in the wavenumbers between the crests or between the troughs by the least square error method or some other methods, and calculating the thickness d from the wavenumber cycle interval and a known refractive index n.

The interference spectrum obtained through the spectroscopy rarely takes the ideal shape due to various factors, such as the wavenumber dependency of the interference efficiency, the wavenumber dependency of the energy distribution of the light source used, and various noises arising from the apparatus. Conventional methods do not take such factors into account; the methods assume that the waveform of the interference spectrum becomes an ideal cosine curve. Thus, it has been difficult to improve the accuracy of the thickness measurement.

In view of the above problem, the applicant has proposed a method of measuring the thickness of a thin film or thin layer in the Japanese Patent Application No. 2002-147107. For a spectrum obtained by a measurement and represented by a graph with the wavenumber of the incident light as the abscissa and the intensity of the interference light as the ordinate, the method defines an approximate spectrum, called the "constructed spectrum," by modifying the ideal cosine curve while taking into account various factors that disturb the waveform. The constructed spectrum is represented by a function with thickness d as a variable. Then, a graph is created to show the least square errors between the measured spectrum and the constructed spectrums for various thicknesses, and the thickness corresponding to the minimum point of the least square error is determined as the desired thickness. By taking into account the factors that disturb the waveform of the interference spectrum, the above method has improved the accuracy of the thickness measurement.

In the process of determining the minimum point of the least square error between the constructed spectrum and the measured spectrum by the method of the aforementioned Japanese Patent Application, the thickness d is changed as a parameter to give various waveforms to the constructed spectrum. This method is applicable to the measurement of the thickness of not only a single-layer film but also a multiple layered film.

The measurement of a multiple layered film, however, is possible only when all the layers have the same refractive index n.

SUMMARY OF THE INVENTION

The present invention addresses the problem, and an object of the present invention is, therefore, to provide a method of and an apparatus for measuring the thickness of a thin layer, which can measure the thickness of each layer of a multiple layered film even when the layers have different refractive indices.

Thus, the present invention provides a method of measuring the thickness of every layer of a thin film consisting of a single or multiple layers, which include the steps of:

casting a measurement light onto the thin film;

observing a measured spectrum of an interference light of lights reflected by a front surface of the thin film, reflected by each boundary between the layers of the thin film, and reflected by a rear surface of the thin film, wherein the measured spectrum shows a cyclic curve;

creating a constructed spectrum including a parameter, wherein the parameter has the same dimension as that representing the cyclic curve of the measured spectrum;

calculating the least square error between the measured spectrum and the constructed spectrum;

detecting a local minimum value of the least square error while changing the parameter within a predetermined range; and calculating the thickness of each layer of the thin film from a parameter yielding the local minimum value, using refractive indices of substances constituting the layers.

In the above method, the measured spectrum can be observed using a wavelength dispersing element, such as a diffraction grating or a prism, and a linear array of photodiodes arranged along the dispersion of the wavelength.

The present invention also provides an apparatus for measuring a thickness of every layer of a thin film consisting of a single or multiple layers, which includes:

means for casting a measurement light onto the thin film;

means for observing a measured spectrum of an interference light of lights reflected by a front surface of the thin film, reflected by each boundary between the layers of the thin film, and reflected by a rear surface of the thin film, wherein the measured spectrum shows a cyclic curve;

means for creating a constructed spectrum including a parameter, wherein the parameter has the same dimension as that representing the cyclic curve of the measured spectrum;

means for calculating the least square error between the measured spectrum and the constructed spectrum;

means for detecting the local minimum value of the least square error while changing the parameter within a predetermined range; and means for calculating the thickness of each layer of the thin film from the parameter yielding the local minimum value, using refractive indices of the substances constituting the layers.

Another method of the present invention includes the steps of:

casting a monochromatic measurement light onto the thin film;

observing a measured spectrum of an interference light of lights reflected by a front surface of the thin film, reflected by each boundary between the layers of the thin film, and reflected by a rear surface of the thin film while changing a wavelength of the measurement light, wherein the measured spectrum shows a cyclic curve;

creating a constructed spectrum including a parameter, wherein the parameter has the same dimension as that representing the cyclic curve of the measured spectrum, calculating the least square error between the measured spectrum and the constructed spectrum, detecting a local minimum value of the least square error while changing the parameter within a predetermined range, and calculating the thickness of each layer of the thin film from the parameter yielding the local minimum value, using refractive indices of substances constituting the layers.

Another apparatus of the present invention corresponding to the above method is an apparatus including:

means for casting a monochromatic measurement light onto the thin;

means for measuring an intensity of an interference light of lights reflected by a front surface of the thin film, reflected by each boundary of the layers of the thin film, and reflected by a rear surface of the thin film;

means for creating a measured spectrum with the measured intensity of the interferance light while changing the wavelength of the measurement light;

means for creating a constructed spectrum including a parameter, wherein the parameter has the same dimension as that representing the cyclic curve of the measured spectrum, means for calculating the least square error between the measured spectrum and the constructed spectrum, means for detecting a local minimum value of the least square error while changing the parameter within a predetermined range, and means for calculating the thickness of each layer of the thin film from the parameter yielding the local minimum value, using refractive indices of the substances constituting the layers.

In the method or apparatus according to the present invention, when the sample film is a multiple layered film, the constructed spectrum is created by a linear sum of plural base spectrums, each having a cycle interval as a parameter, where the dimension of the cycle interval is the same as that of the cycle interval of the measured spectrum.

DETAILED DESCRIPTION OF PREFERRED EMBODIMENTS

A method embodying the present invention is described.

Figure 1:
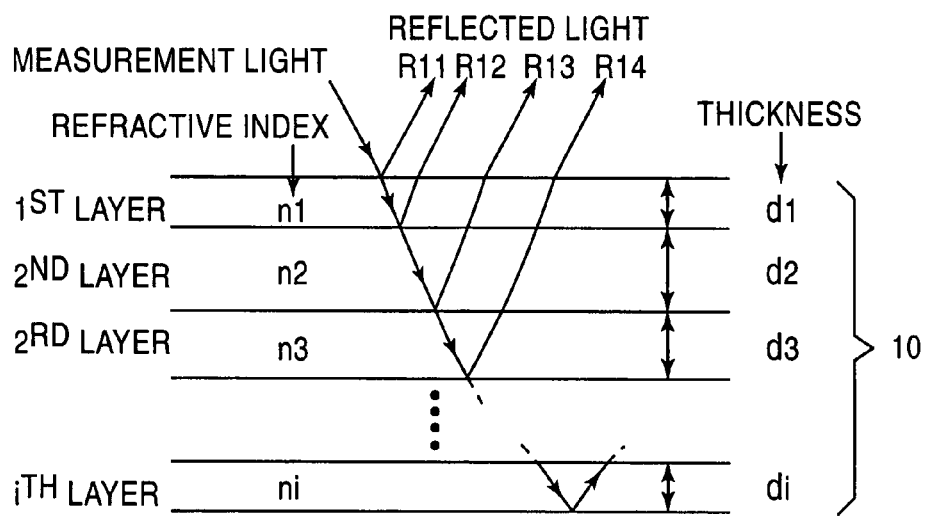
FIG. 1 shows an example of a multiple layered film onto which a measurement light is cast and by which the light is reflected.

Suppose a measurement light having a single wavelength is cast onto a multiple layered sample film 10 composed of i layers having the refractive indices of $n_1, n_2, \ldots, n_i$, respectively, as shown in FIG. 1. Then, the measurement light is reflected by the front surface (i.e. the boundary surface between the film and the air), the boundary surfaces between the layers, and the rear surface (the boundary surface between the film and the ambient air) of the sample film 10. Thus, the sample film 10 produces (i+1) rays of reflected light with the (i+1) layers of the boundary surfaces. The reflected light waves interfere with each other, producing an interference light. The interference light is detected as the reflected light from the surface of the sample film 10.

Figure 2:
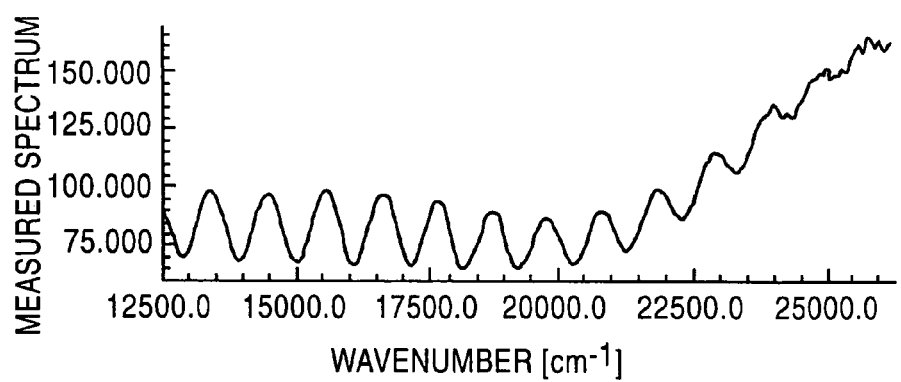
FIG. 2 shows an example of the measured spectrum of a two-layered film.

Changing (or scanning) the wavelength of the measurement light will change the intensity of the reflected light coming from the sample film 10. When a graph is drawn with the wavenumber or wavelength as the abscissa and the intensity of the reflected light as the ordinate, the graph becomes a cyclic spectrum, which is hereby called the "measured spectrum." FIG. 2 shows an example of the measured spectrum obtained by the measurement of a film composed of two layers having different refractive indices and being 200 nm and 4000 nm in thickness.

The following description assumes that the wavenumber is taken as the abscissa. In this case, the measured spectrum will show the following characteristics (or factors).

(i) There is a certain regular cycle.

(ii) There is an offset.

(iii) There is an almost linear increasing drift.

(iv) The amplitude of the interference wave decreases as the wavenumber increases because the interference efficiency decreases as the wavenumber increases.

The characteristic (i) probably results from the interference of two light waves. A film having i layers provides (i+1) reflective surfaces. In this case, the number of different combinations of two interfering light waves is $_{(i+1)}C_2$. Denoting $_{(i+1)}C_2$ by j, the characteristic (i) probably results from the superimposition of the j pieces of cyclic interference spectrums each produced by a different pair of light waves. For example, a film having two layers produces a reflected light composed of three cyclic interference spectrums superimposed on each other. The characteristics (ii) are probably due to the background noise from the apparatus.

The measured spectrum shown in FIG. 2 seems to be composed of a first cosine wave having the cycle interval of about 1000 $cm^{-1}$, a second cosine wave having the cycle interval more than ten times as long as that of the first cosine wave, an offset and an increasing drift, all superimposed on each other. The offset and the drift are commonly observed components, as explained above. Since the sample film in FIG. 2 is composed of two layers, there must be three cyclic spectrums superimposed on each other. However, there are only two cyclic spectrums observable in the graph of FIG. 2. This fact shows that the thickness of each layer of the film cannot be directly calculated from the measured spectrum. In such a case, it is necessary to use the method according to the present invention.

Letting $\omega_1, \omega_2, \ldots, \omega_j$ denote the angular frequencies of the two-beam interference spectrums of the aforementioned characteristic (i), and taking the other factors (ii), (iii) and (iv) into consideration, the spectrum can be approximately represented by the following equation:

$$f(x)=\alpha_0+\alpha_1 x+\alpha_2(1/x)\sin(\omega_1 x+\delta_1)+\alpha_3(1/x)\sin(\omega_2 x+\delta_2)+\ldots+\alpha_{j+1}(1/x)\sin(\omega_j x+\delta_j) \quad (1),$$

where the angular frequencies $\omega_1, \ldots, \omega_j$ have the dimension of length because, in the present case, the abscissa of the measurement spectrum represents the wavenumber, which is denoted by "x."

In the right side of equation (1), the first term represents the offset, the second term represents the drift, and the third and subsequent terms represent cyclic waveforms. More precisely, the (1/x) of each of the third and subsequent terms shows the decrease in the amplitude according to the increase in the wavenumber, and $\delta$ means the shift in the phase, which becomes conspicuous as the thickness becomes very large.

Since $$\sin(\omega x+\delta)=\sin\omega x\cos\delta+\cos\omega x\sin\delta,$$

equation (1) can be rewritten as $$f(x)=\alpha_0+\alpha_1 x+\alpha_2(1/x)\sin(\omega_1 x)+\alpha_3(1/x)\cos(\omega_1 x)+\ldots+\alpha_{2j}(1/x)\sin(\omega_j x)+\alpha_{2j+1}(1/x)\cos(\omega_j x) \quad (2).$$

Using $(2j+2)$ functions $f_0(x), f_1(x), \ldots, f_{2j}(x)$ and $f_{2j+1}(x)$ defined by $$f_0(x)=1,$$

$$f_1(x)=x,$$

$$f_2(x)=(1/x)\sin(\omega_1 x),$$

$$f_3(x)=(1/x)\cos(\omega_1 x),$$

$$\ldots$$

$$f_{2j}(x)=(1/x)\sin(\omega_j x), \text{ and}$$

$$f_{2j+1}(x)=(1/x)\cos(\omega_j x),$$

the function $f(x)$ can be written as a linear sum of the above $(2j+2)$ functions, as follows:

$$f(x)=\alpha_0 f_0(x)+\alpha_1 f_1(x)+\alpha_2 f_2(x)+\alpha_3 f_3(x)+\ldots+\alpha_{2j}f_{2j}(x)+\alpha_{2j+1}f_{2j+1}(x) \quad (3).$$

As explained above, the function $f(x)$ is an appropriate approximation of a measured spectrum. Therefore, the following description uses the function $f(x)$ as the constructed spectrum corresponding to a measured spectrum $g(x)$. The function $f(x)$ has j unknown values $\omega_1, \ldots, \omega_j$.

The square error between the function $f(x)$ and the measured spectrum $g(x)$ will be minimized when the function $f(x)$ is the best approximation of the measured spectrum $g(x)$. Taking this into account, a set of values is given to the unknown angular frequencies $[\omega_1, \omega_2, \ldots, \omega_j]$, and the coefficients $\alpha_0, \omega_1, \ldots, \omega_{2j+1}$ are changed so that the square error between the function $f(x)$ and the measured spectrum $g(x)$ is minimized. This operation is performed for various sets of angular frequencies $[\omega_1, \omega_2, \ldots, \omega_j]$, and the least square error is obtained for each set of angular frequencies $[\omega_1, \omega_2, \ldots, \omega_j]$. The angular frequencies $[\omega_1, \omega_2, \ldots, \omega_j]$ that give the minimum value of the least square error is chosen as the most appropriate approximation of the angular frequencies of the j cyclic waveforms superimposed on each other in the measured spectrum.

The above calculation, however, is impractical because it deals with j unknown values $[\omega_1, \omega_2, \ldots, \omega_j]$. Taking this into account, it is assumed here that there is only one unknown angular frequency, $\omega$. Using four functions $fa_0(x)$, $fa_1(x)$, $fa_2(x)$ and $fa_3(x)$ defined by $$fa_0(x)=1,$$

$$fa_1(x)=x,$$

$$fa_2(x)=(1/x)\sin(\omega x), \text{ and}$$

$$fa_3(x)=(1/x)\cos(\omega x),$$

the function $fa(x)$ is written here as a linear sum of the above four functions, as follows:

$$fa(x)=\alpha_0 fa_0(x)+\alpha_1 fa_1(x)+\alpha_2 fa_2(x)+\alpha_3 fa_3(x) \quad (3').$$

The equation (3') has only one unknown frequency value, $\omega$. With the frequency $\omega$ fixed at a certain value, the square error between the function $fa(x)$ and the measured spectrum $g(x)$ is calculated while changing the coefficients $\alpha_0, \alpha_1, \alpha_2$ and $\alpha_3$. The function $fa(x)$ that gives the minimum value of the square error is selected as the constructed spectrum for the given frequency $\omega$. Performing this operation for various $\omega$ values, it is possible to find a value of $\omega$ that minimizes the least square error. The frequency $\omega$ thus found corresponds to the function $fa(x)$ that is the best approximation of the measured spectrum $g(x)$.

Now, suppose the error between the measured spectrum and the constructed spectrum is represented by an error function whose variables include the angular frequency $\omega$ and the cycle interval T. Here, the measured spectrum and the constructed spectrum are each represented by a vector whose elements include the intensity corresponding to wavenumbers predetermined at intervals of $\Delta T$, or corresponding to wavelengths predetermined at intervals of $\Delta\lambda$.

Figure 3:
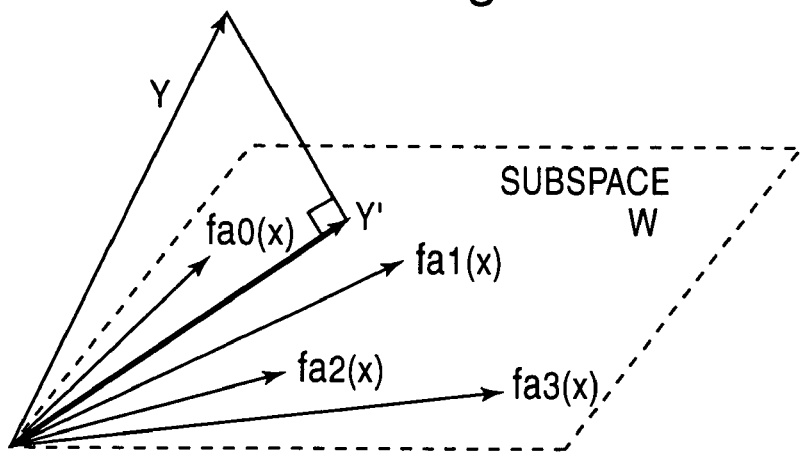
FIG. 3 shows the relation between the measured vector and the constructed vector.

As explained above, the constructed spectrum $fa(x)$ is defined here as a linear sum of the four functions $fa_0(x)$, $fa_1(x)$, $fa_2(x)$ and $fa_3(x)$. This means the four functions $fa_0(x)$, $fa_1(x)$, $fa_2(x)$ and $fa_3(x)$ can be regarded as four base vectors whose vectorial sum provides the constructed vector $fa(x)$. In this case, the distance between the measured vector Y and the subspace W defined by the four base vectors $fa_0(x)$, $fa_1(x)$, $fa_2(x)$ and $fa_3(x)$ in the vector space corresponds to the local minimum value of the least square error between the measured spectrum $g(x)$ and the constructed spectrum $fa(x)$ (see FIG. 3). That is, the best constructed spectrum $fa(x)$ of the measured spectrum corresponds to the constructed vector Y' of the foot of the perpendicular line dropped from the measured vector Y onto the subspace W. The constructed vector Y' can be calculated as follows.

The measured vector Y and the vector X representing the measurement point (wavenumber) for the measured vector Y are given as follows.

$$Y = \begin{pmatrix} y_0 \\ y_1 \\ \vdots \\ y_{N-1} \end{pmatrix}, X = \begin{pmatrix} x_0 \\ x_1 \\ \vdots \\ x_{N-1} \end{pmatrix}$$

With the four base vectors $fa_0(x)$, $fa_1(x)$, $fa_2(x)$ and $fa_3(x)$ expressed using the elements of the vector X, a matrix A(T) is defined as the function of the cycle interval $T=2\pi/\omega$, as shown by the following equation (4).

$$A(T) = \begin{pmatrix} 1 & \frac{1}{x_0}\cos\frac{2\pi}{T}x_0 & \frac{1}{x_0}\sin\frac{2\pi}{T}x_0 & 0 \\ 1 & \frac{1}{x_1}\cos\frac{2\pi}{T}x_1 & \frac{1}{x_1}\sin\frac{2\pi}{T}x_1 & 1 \\ \vdots & \vdots & \vdots & \vdots \\ 1 & \frac{1}{x_{N-1}}\cos\frac{2\pi}{T}x_{N-1} & \frac{1}{x_{N-1}}\sin\frac{2\pi}{T}x_{N-1} & N-1 \end{pmatrix} \quad (4)$$

As explained above, the constructed vector Y' is defined by the foot of the perpendicular line dropped from the measured vector Y onto the subspace W. Therefore, the vector Y'−Y is orthogonal to each of the four base vectors. This relation can be expressed by the equation $^tA(Y'-Y)=0$, which can be rewritten into the following equation (5) to obtain the constructed vector Y'.

$$Y' = A(^tAA)^{-1}\,^tAY \quad (5)$$

Using the measured vector Y and the constructed vector Y', the error function $\epsilon(T)$ is defined here by the following equation.

$$\varepsilon(T) = \sqrt{\frac{^t(Y-Y')(Y-Y')}{N-1}} \quad (6)$$

Equation (6) provides the least square error between the measured spectrum and the constructed spectrum for a given cycle interval T. When a graph is drawn with the cycle interval T as the abscissa and the error function $\epsilon(T)$ as the ordinate, the graph will have one or more local minimum points. Each cycle interval T at which each local minimum point appears corresponds to one of the cycle intervals of the j modes of two-beam interferences.

The j modes of two-beam interferences can be divided into two groups. The first group includes i modes of interferences, each of which is produced by two-beams coming from the front and rear surfaces of each of the i layers. The other group includes (j−i) modes of interferences, each of which is produced by two-beams coming from the front and rear surfaces of two or more layers stacked. For example, the interference between the reflected light waves R11 and R12 in FIG. 1 requires only the first layer. Similarly, the interference between the reflected light waves R12 and R13 requires only the second layer. The interference between the reflected light waves R12 and R13, on the other hand, requires the first and second layers. The thickness of each of the i layers can be obtained by analyzing only the aforementioned i kinds of interferences.

Thus, in practical measurements, it is necessary to identify the local minimum points that correspond to the interferences each produced by each of the i layers. This is practically possible; it can often be correctly determined which local minimum point corresponds to the interference of which pair of light waves. An example is the measurement of the thickness of a film for the purpose of quality control. In this case, plural sample films of the same kind are measured to determine whether the thickness of each film is appropriate, so that the error curves always take similar forms. Therefore, it is possible to empirically determine which local minimum point corresponds to the interference of which pair of light waves. In the case where some other method is available for measuring the thickness of each layer of a multiple layered film with certain accuracy, it is possible to estimate the positions of the local minimum points concerned from the measured values, taking into account the two-beam interference.

The relation between the cycle interval T and the thickness d of the sample film for a local minimum point selected can be determined as follows. When, as is already known, a ray of measurement light enters a layer of refractive index n at an incident angle $\theta$, the basic equation for calculating the thickness d of the layer is given by $$d[\text{cm}] = \Delta m / \{2 \cdot (n^2 - \sin^2\theta)^{1/2}(1/\lambda_2 - 1/\lambda_1)\} \quad (7),$$

where $\Delta m$ is the order number of the peak of wavelength $\lambda_2$ when counted from the peak of wavelength $\lambda_2$ toward shorter wavelengths. Normally, $\Delta m=1$.

Using the cycle interval $T[\text{cm}^{-1}]=1/\lambda_2 - 1/\lambda_1$, the equation (7) can be rewritten as $$d = \tfrac{1}{2} \cdot (n^2 - \sin^2\theta)^{1/2} T,$$

and it is further rewritten as $$T = 1/\{2 \cdot (n^2 - \sin^2\theta)^{1/2} d\} = 1 \times 10^7 / \{2 \cdot (n^2 - \sin^2\theta)^{1/2} d'\},$$

where d is represented in cm, and d' in nm.

When $\theta=0$, the terms including $\sin\theta$ can be neglected, and the following equation is obtained.

$$T = 1 \times 10^7 / (2 \cdot n \cdot d') \quad (8)$$

The equation (8) can be rewritten as follows to obtain the thickness of the layer.

$$d'[\text{nm}] = 1 \times 10^7 / (2 \cdot n \cdot T) \quad (9)$$

Substituting the cycle interval of the two-beam interference independently produced by each layer and the refractive index of each layer into equation (9) will give the thickness of each layer.

Figure 4:
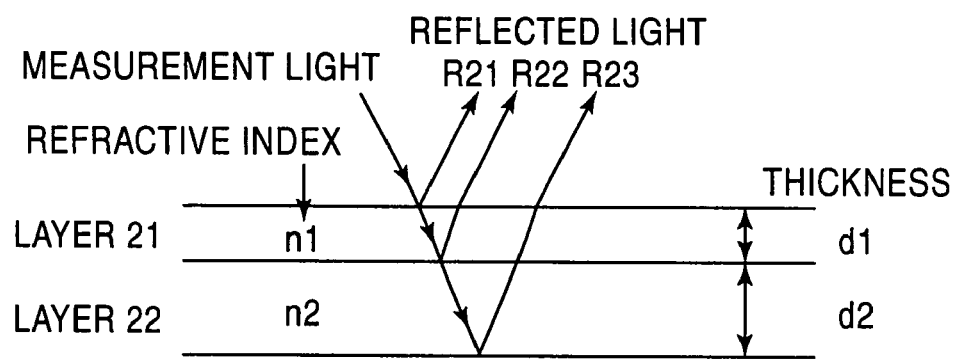
FIG. 4 shows an example of a two-layered film onto which a measurement light is cast and by which the light is reflected.

An example of the above method for measuring the thickness of a film is described. The film in this example has two layers 21 and 22, as shown in FIG. 4. In this case, the film reflects three light waves R21, R22 and R23, so that there are three modes of interference: [R21, R22], [R22, R23] and [R21, R23]. The interference [R21, R22] is produced by the first layer 21, the interference [R22, R23] is produced by the second layer 22, and the interference [R21, R23] is produced by the combination of the two layers 21 and 22. Therefore, the thicknesses of the two layers of the film should be calculated by analyzing the first and second interferences [R21, R22] and [R22, R23].

Figure 5:
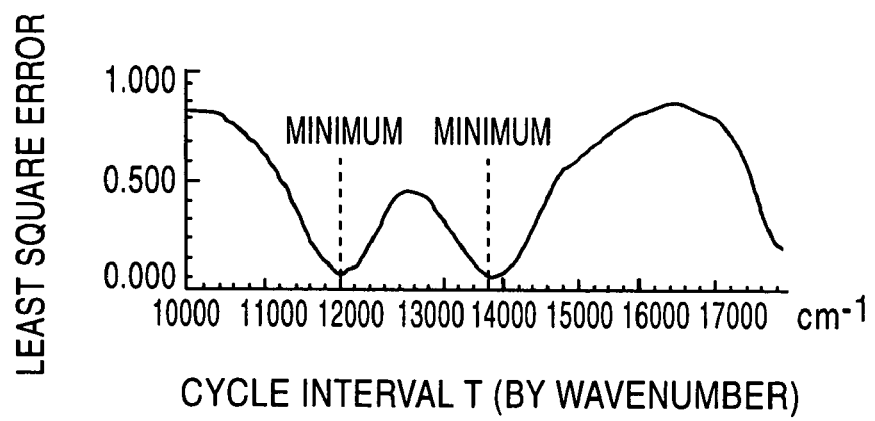
FIG. 5 shows the relation between the cycle interval and the least square error between the measured spectrum and the constructed spectrum obtained by the measurement of a two-layered film.

FIG. 5 shows a graph in which the least square error calculated by equation (6) is plotted against the cycle interval T. The least square error is calculated from the measured spectrum obtained by casting a monochromatic measurement light onto a two-layered film and scanning the wavelength of the measurement light. The graph shows two local minimum points at cycle intervals 12000 cm$^{-1}$ and 14000 cm$^{-1}$. Though not shown in the drawing, there is another local minimum point at a cycle interval under 10000 cm$^{-1}$. Thus, the graph has three local minimum points. Each of the three local minimum points corresponds to each of the two-beam interferences [R21, R22], [R22, R23] and [R21, R23].

The correspondence between the local minimum points and the two-beam interferences should be determined empirically, or by an appropriate method. An example of such methods is as follows. After the creation of the graph of FIG. 5, the thickness of the layer 21 is increased while that of the layer 22 is unchanged, and the measurement is similarly performed to create another graph. Comparison of the two graphs will show that one of the local minimum points has shifted in the direction of x-axis (i.e. wavenumber or cycle interval). This shift identifies the local minimum point that corresponds to the interference [R21, R22] produced by the layer 21. It is assumed here that the local minimum point at 12000 cm$^{-1}$ corresponds to the interference [R21, R22] produced by the layer 21, and the local minimum point at 14000 cm$^{-1}$ corresponds to the interference [R22, R23] produced by the layer 22. From this assumption, it results that the third local minimum point at the cycle interval under 10000 cm$^{-1}$ corresponds to the interference between the reflected light waves R21 and R23 produced by the two layers 21 and 22. Therefore, the third local minimum point is not used in the thickness calculation.

Letting $d_1$ and $d_2$ denote the thicknesses of the first and second layers 21 and 22, and substituting the cycle intervals (12000 cm$^{-1}$ and 14000 cm$^{-1}$) and the refractive indices $n_1$, and $n_2$ into equation (9), the thicknesses $d_1$ and $d_2$ are given as follows.

$$d_1[\text{nm}]=1\times10^7/(2\cdot n_1\cdot 12000)$$

$$d_2[\text{nm}]=1\times10^7/(2\cdot n_2\cdot 14000)$$

The method described in the Japanese Patent Application No. 2002-147107 also uses an error function defined similar to equation (6), in which thickness is used in place of cycle interval, and the error function contains reflective index. In contrast, by using cycle interval as a variable, the method according to the present invention uses no refractive index in not only equation (6) but also equations (4) and (5) to be substituted into equation (6). This means that the thickness of each layer can be measured even when the sample film consists of plural layers differing in refractive index and thickness.

The foregoing discussion has assumed that the sample film is a multiple layered film. It should be noted that the method according to the present invention is applicable to the measurement of a single-layer film. In this case, the two-beam interference occurs at only one wavenumber, so that the least square error has only one minimum value.

Figure 6:
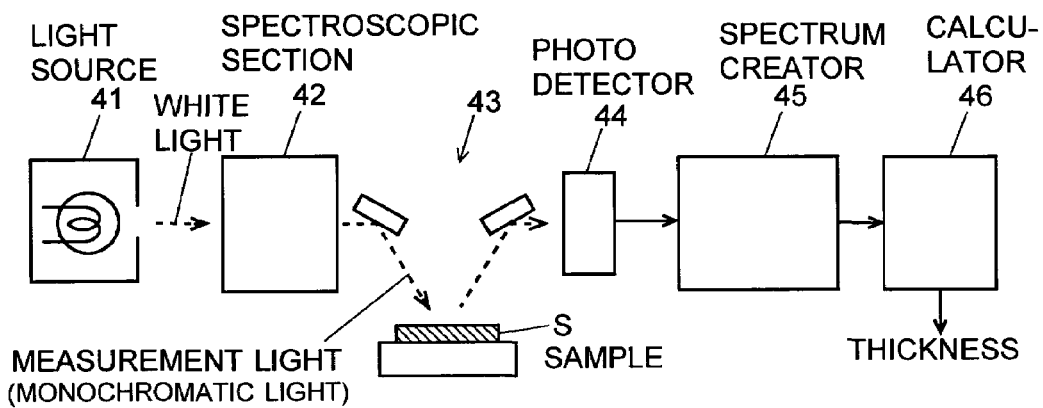
FIG. 6 schematically shows the construction of an apparatus embodying the present invention.

An apparatus embodying the present invention is described. FIG. 6 schematically shows the construction of the apparatus of this embodiment.

The apparatus includes a light source 41, a spectroscopic section 42, an optical system 43, a photodetector 44, a spectrum-creating section 45 and a calculating section 46, where an interference spectrum created in the spectrum-creating section 45 is sent to the calculating section 46 and a thickness is calculated based on the interference spectrum according to the method described later. The spectrum-creating section 45 and the calculating section 46 are actually constructed by running appropriate programs on a personal computer.

The basic operation of the apparatus is as follows. From the white light emitted from the light source 41, the spectroscopic section 42 extracts a ray of monochromatic measurement light having a single wavelength. The measurement light is cast on a sample S through the optical system 43. The sample S may be either a single-layer film or multiple layered film. It is assumed here that the sample S has i layers. The sample S reflects the light on the front and rear surfaces, and also on the boundary surfaces in the case of multiple layered films. The reflected light waves travel again through optical system 43 onto the photodetector 44. Receiving the light waves, the photodetector 44 generates electrical signals corresponding to the total intensity of the reflected light waves, and sends the signals to the spectrum-creating section 45. The reflected light waves interfere with each other, producing an interference light, as described later. When the wavelength of the measurement light is changed (or scanned), the output signal of the photodetector 44 forms a cyclic spectrum (or an interference spectrum). Based on the intensity signal from the photodetector 44, the spectrum-creating section 45 creates the interference spectrum with the wavenumber (or wavelength) as the abscissa and the intensity as the ordinate. The interference spectrum thus created is the measurement spectrum described above. Receiving the interference spectrum, the calculating section 46 calculates the thickness of each layer of the sample by a process according to the above-described method.

Figure 7:
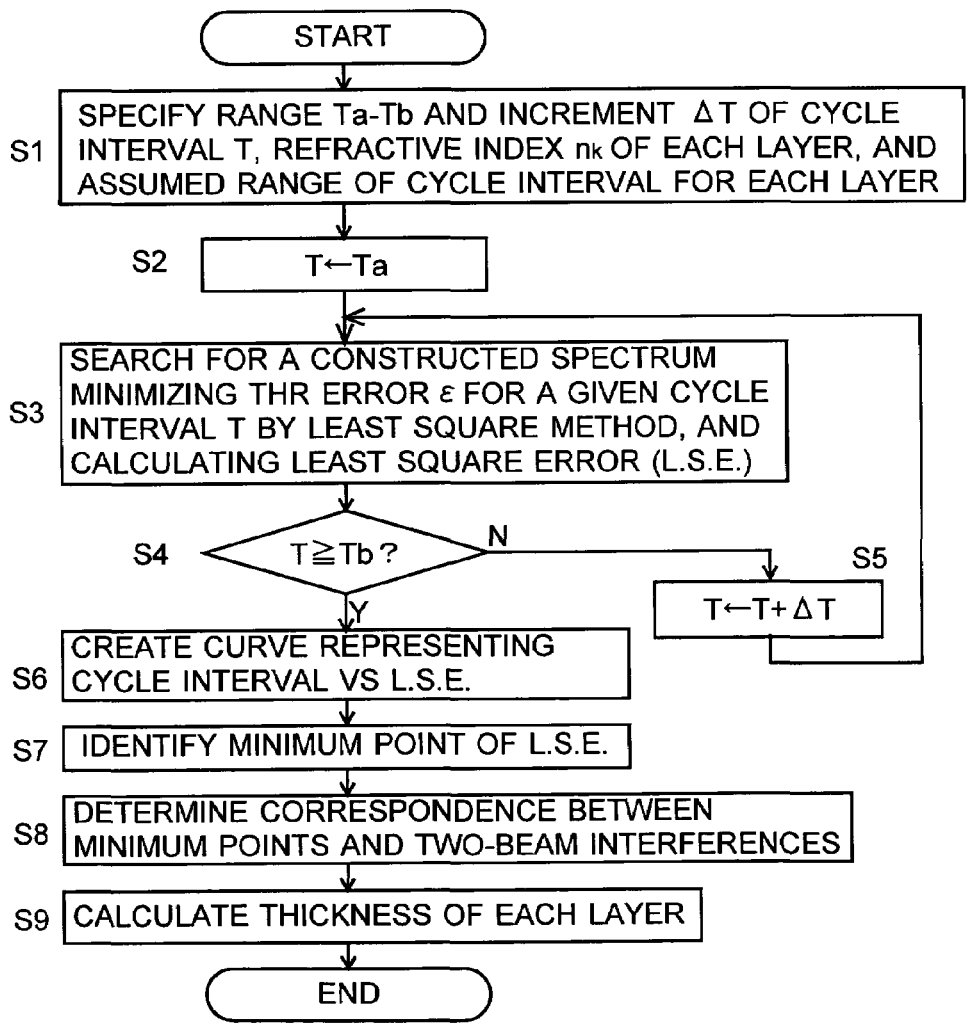
FIG. 7 shows the steps of calculating the thickness of a layer by the apparatus embodying the present invention.
Figure 8:
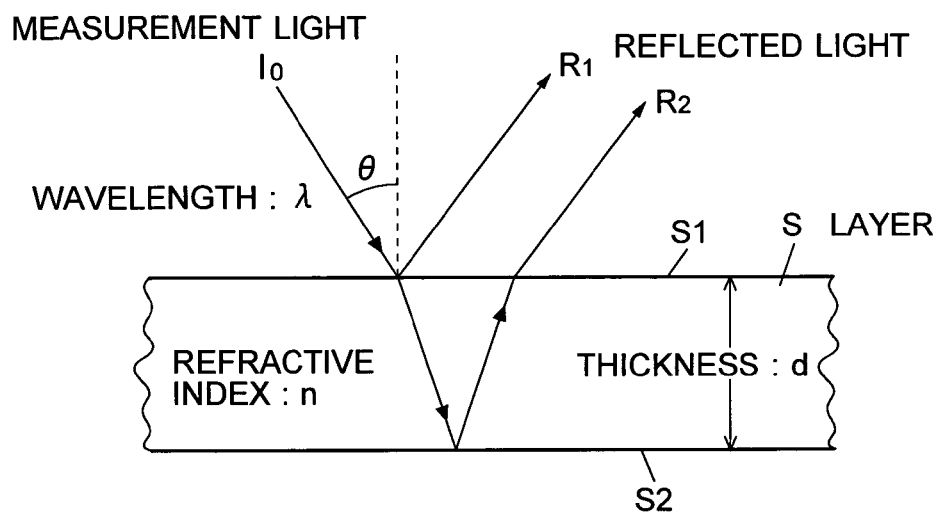
FIG. 8 illustrates the principle of the spectroscopic measurement of the thickness of a film.

The calculation performed by the calculating section 46 is described, using FIG. 7.

In Step S1, the following information is externally specified as the calculation conditions: the upper limit Ta, the lower limit Tb and the interval ΔT of the cycle intervals to perform the calculation; and the refractive indices $n_k$ (k= 1 . . . i) of the layers of the sample. When the cycle intervals at which local minimum points will appear have been roughly estimated, the upper and lower limits Ta and Tb should be determined so that the range Ta–Tb covers the estimated cycle intervals, to reduce the calculation time. In the case of using a multiple layered sample, the calculation should cover the entirety of such local minimum points that correspond to the interferences each produced by each layer of the sample. Shorter intervals ΔT will provide higher calculation accuracy, but will require longer calculation time. Taking into account the trade-off between the accuracy and the calculation time, the operator should determine the interval ΔT.

In the case of measuring a multiple layered film, Step S1 may further include a sub-step of externally specifying an assumed range of cycle interval for each local minimum point corresponding to the interference produced by each layer. The assumed range is used in Step S8 described later. The assumed range of cycle interval for each layer may be otherwise specified in Step S8.

In the case of repeatedly measuring the same kind of sample, it is possible to pre-register the information to be entered in Step S1 so that the operator does not need to enter the information every time the measurement of the sample is repeated.

When the calculation is started, the cycle interval T is set at Ta (Step S2), the constructed spectrum fa(x) or constructed vector Y' is searched for, and the least square error corresponding to the constructed spectrum fa(x) is obtained, as described above (Step S3).

Next, it is determined whether the cycle interval T at the moment is equal to or greater than Tb (Step S4). When T is less than Tb, the cycle interval T is incremented by ΔT (Step S5), and the operation returns to Step S3. Steps from S3 to S5 are repeated until the cycle interval T becomes equal to or greater than Tb in Step S4. Thus, the range from Ta to Tb is scanned to search for constructed spectrums or constructed vectors at intervals ΔT, and the least square error is obtained for each of the constructed spectrums.

The result of the calculation is represented by a curve showing the relation between the cycle interval and the least square error, as shown in FIG. 5 (Step S6). Then, this curve is searched for one or more local minimum points (Step S7).

Within each assumed range of cycle interval specified for each layer in Step S1, the correspondence between the local minimum point obtained in Step S7 and the two-beam interference is examined (Step S8). That is, when an assumed range contains only one minimum point, it means that the minimum point corresponds to the two-beam interference produced by the layer corresponding to the assumed range concerned.

If a minimum point belongs to none of the assumed ranges, or if there are plural local minimum points within a single assumed range, it is impossible to automatically determine which two-beam interference corresponds to the local minimum point. In such a case, based on the curve showing the relation between the cycle interval and the least square error, the operator should determine, empirically or by other methods, which local minimum point corresponds to which two-beam interference, and enter information indicating the correspondence into the calculating section 46. Alternatively, it is possible to remove the step of specifying the assumed ranges from Step S1 and instead provide Step S8 with a step of letting the operator manually determine the correspondence between all the necessary local minimum points and the two-beam interferences, based on the curve showing the relation between the cycle interval and the least square error.

To calculate the thickness of each of the first to ith layers, the calculation by equation (9) is performed, using the cycle interval corresponding to the local minimum point identified in Step S8 and the refractive indices entered in Step S1 (Step S9).

The above embodiments are mere examples of the present invention and may be modified in various ways. For example, the base spectrums used for representing the constructed spectrum may be differently defined. When the film is very thin, the waveform of the interference spectrum tends to have peaks or troughs whose cycle interval cannot be clearly determined. In such a case, the cosine terms and/or (1/x) terms may be removed from the base spectrums to obtain a better approximation result by easier calculation processes. Furthermore, the approximation accuracy can be improved by appropriately changing, adding or removing a term or terms of equation (3').

In the above embodiments, the interference produced by two or more layers combined is not taken into account because the thickness of each layer can be calculated from only the interference produced by the layer concerned. However, when the interference produced by each layer cannot be separately extracted because of plural local minimum points located too closely, the thickness can be calculated by using the interference produced by a combination of two or more layers. For example, in FIG. 1, when the local minimum point corresponding to the interference [R11, R12] is located too close to another local minimum point to calculate the thickness $d_1$ of the first layer from the interference, the thickness $d_1$ can be calculated by $$T_{12} = 1 \times 10^7 / (2 \cdot (n_1 d_1 + n_2 d_2)),$$

where $d_2$ is the thickness of the second layer calculated from the interference [R12, R13], and $T_{12}$ is the cycle interval at which the local minimum point corresponding to the interference [R11, R13] appears.

As described above, the method and the apparatus according to the present invention greatly improves the thickness measurement accuracy by taking into account various factors appearing in the measured spectrum, such as the offset, drift, phase shift, and amplitude change of the cyclic waveform. Also, the method and the apparatus according to the present invention makes it possible to measure the thickness of each layer of multiple layered films even when the layers differ from each other in thickness and refractive index.

What is claimed is:

1. A method of measuring a thickness of every layer of a thin film consisting of a single or multiple layers, comprising steps of:
   casting a measurement light onto the thin film;
   observing a measured spectrum of an interference light of lights reflected by a front surface of the thin film, reflected by each boundary between the layers of the thin film, and reflected by a rear surface of the thin film, wherein the measured spectrum shows a cyclic curve;
   creating a constructed spectrum including a parameter, wherein the parameter has the same dimension as that representing the cyclic curve of the measured spectrum;
   calculating the least square error between the measured spectrum and the constructed spectrum;
   detecting a local minimum value of the least square error while changing the parameter within a predetermined range; and
   calculating the thickness of each layer of the thin film from a parameter yielding the local minimum value, using refractive indices of substances constituting the layers.

2. The method according to claim 1, wherein the measured spectrum is obtained by a wavelength dispersing element and a linear array of photodiodes arranged along the dispersion of the wavelength.

3. The method according to claim 1, wherein the thin film is a multiple-layered film, and the constructed spectrum is created by a linear sum of a plurality of base spectrums each including a parameter representing a cycle interval whose dimension is the same as that of the cycle interval of the measured spectrum.

4. The method according to claim 3, wherein the base spectrums are respectively expressed by the following functions:

$$f_0(x) = 1,$$

$$f_1(x) = x,$$

$$f_2(x) = (1/x)\sin(\omega_1 x),$$

$$f_3(x) = (1/x)\cos(\omega_1 x),$$

$$\ldots$$

$$f_{2j}(x) = (1/x)\sin(\omega_j x), \text{ and}$$

$$f_{2j+1}(x) = (1/x)\cos(\omega_j x),$$

where j is the number of two-beam interferences produced by different pairs of two light waves.

5. The method according to claim 3, wherein the correspondence between the minimum points and two-beam interferences produced by different combinations of two light waves are determined by a preliminary measurement including steps of increasing the thickness of one of the layers while maintaining the thicknesses of the other layers unchanged, performing the measurement to create another measured spectrum, and comparing the two measured spectrums to identify a minimum point shifting in the direction of the cycle interval, and calculating the thickness of the aforementioned one of the layers from the cycle interval corresponding to the identified minimum point.

6. A method according to claim 3, further comprising steps of externally specifying an assumed range of cycle interval for each minimum point corresponding to the interference produced by each layer.

7. An apparatus for measuring a thickness of every layer of a thin film consisting of a single or multiple layers, comprising:
   means for casting a measurement light onto the thin film;
   means for observing a measured spectrum of an interference light of lights reflected by a front surface of the thin film, reflected by each boundary between the layers of the thin film, and reflected by a rear surface of the thin film, wherein the measured spectrum shows a cyclic curve;
   means for creating a constructed spectrum including a parameter, wherein the parameter has the same dimension as that representing the cyclic curve of the measured spectrum;
   means for calculating the least square error between the measured spectrum and the constructed spectrum;
   means for detecting the local minimum value of the least square error while changing the parameter within a predetermined range; and
   means for calculating the thickness of each layer of the thin film from the parameter yielding the local minimum value, using refractive indices of the substances constituting the layers.

8. The apparatus according to claim 7, wherein the sample film is a multiple layered film, the constructed spectrum is created by a linear sum of a plurality of base spectrums, each including a parameter representing a cycle interval whose dimension is the same as that of the cycle interval of the measured spectrum.

9. The apparatus according to claim 8, wherein the base spectrums are respectively expressed by the following functions:

$f_0(x)=1,$ $f_1(x)=x,$ $f_2(x)=(1/x)\sin(\omega_1 x),$ $f_3(x)=(1/x)\cos(\omega_1 x),$ $f_{2j}(x)=(1/x)\sin(\omega_j x),$ and $f_{2j+1}(x)=(1/x)\cos(\omega_j x),$ where j is the number of two-beam interferences produced by different pairs of two light waves.

10. A method of measuring a thickness of every layer of a thin film consisting of a single or multiple layers, comprising steps of:
   casting a monochromatic measurement light onto the thin film;
   observing a measured spectrum of an interference light of lights reflected by a front surface of the thin film, reflected by each boundary between the layers of the thin film, and reflected by a rear surface of the thin film while changing a wavelength of the measurement light, wherein the measured spectrum shows a cyclic curve;
   creating a constructed spectrum including a parameter, wherein the parameter has the same dimension as that representing the cyclic curve of the measured spectrum;
   calculating the least square error between the measured spectrum and the constructed spectrum;
   detecting a local minimum value of the least square error while changing the parameter within a predetermined range; and
   calculating the thickness of each layer of the thin film from the parameter yielding the local minimum value, using refractive indices of substances constituting the layers.

11. The method according to claim 10, wherein the thin film is a multiple layered film, and the constructed spectrum is created by a linear sum of a plurality of base spectrums, each including a parameter representing a cycle interval whose dimension is the same as that of the cycle interval of the measured spectrum.

12. The method according to claim 11, wherein the base spectrums are respectively expressed by the following functions:

$f_0(x)=1,$ $f_1(x)=x,$ $f_2(x)=(1/x)\sin(\omega_1 x),$ $f_3(x)=(1/x)\cos(\omega_1 x),$ $\ldots$ $f_{2j}(x)=(1/x)\sin(\omega_j x),$ and $f_{2j+1}(x)=(1/x)\cos(\omega_j x),$ where j is the number of two-beam interferences produced by different pairs of two light waves.

13. The method according to claim 11, wherein the correspondence between the local minimum points and two-beam interferences produced by different combinations of two light waves are determined by a preliminary measurement including steps of increasing the thickness of one of the layers while maintaining the thicknesses of the other layers unchanged, performing the measurement to create another measured spectrum, and comparing the two measured spectrums to identify a local minimum point shifting in the direction of the cycle interval, and calculating the thickness of the aforementioned one of the layers from the cycle interval corresponding to the identified local minimum point.

14. A method according to claim 11, further comprising steps of externally specifying an assumed range of cycle interval for each local minimum point corresponding to the interference produced by each layer.

15. An apparatus for measuring a thickness of a thin film consisting of a single or multiple layers, comprising:
   means for casting a monochromatic measurement light onto the thin;
   means for measuring an intensity of an interference light of lights reflected by a front surface of the thin film, reflected by each boundary of the layers of the thin film, and reflected by a rear surface of the thin film;
   means for creating a measured spectrum with the measured intensity of the interferance light while changing the wavelength of the measurement light;

means for creating a constructed spectrum including a parameter, wherein the parameter has the same dimension as that representing the cyclic curve of the measured spectrum;

means for calculating the least square error between the measured spectrum and the constructed spectrum;

means for detecting a local minimum value of the least square error while changing the parameter within a predetermined range; and means for calculating the thickness of each layer of the thin film from the parameter yielding the local minimum value, using refractive indices of the substances constituting the layers.

16. The apparatus according to claim 15, wherein the sample film is a multiple layered film, the constructed spectrum is created by a linear sum of a plurality of base spectrums each including a parameter representing a cycle interval whose dimension is the same as that of the cycle interval of the measured spectrum.

17. The apparatus according to claim 16, wherein the base spectrums are respectively expressed by the following functions:

$f_0(x)=1$, $f_1(x)=x$, $f_2(x)=(1/x)\sin(\omega_1 x)$, $f_3(x)=(1/x)\cos(\omega_1 x)$,

. . .

$f_{2j}(x)=(1/x)\sin(\omega_1 x)$, and $f_{2j+1}(x)=(1/x)\cos(\omega_j x)$, where j is the number of two-beam interferences produced by different pairs of two light waves.

* * * * *